United States Patent
Huang et al.

(10) Patent No.: US 12,493,226 B2
(45) Date of Patent: Dec. 9, 2025

(54) BASE ASSEMBLY OF VOICE COIL MOTOR AND VOICE COIL MOTOR

(71) Applicant: Lanto Electronic Limited, Kunshan (CN)

(72) Inventors: Wen-Yen Huang, Taipei (TW); Fu-Yuan Wu, Taipei (TW); Shang-Yu Hsu, Taipei (TW); Meng-Ting Lin, Taipei (TW); BingBing Ma, Kunshan (CN); Jie Du, Kunshan (CN)

(73) Assignee: LANTO ELECTRONIC LIMITED, Kunshan (CN)

( * ) Notice: Subject to any disclaimer, the term of this patent is extended or adjusted under 35 U.S.C. 154(b) by 103 days.

(21) Appl. No.: 18/394,761

(22) Filed: Dec. 22, 2023

(65) Prior Publication Data

US 2024/0134250 A1    Apr. 25, 2024

Related U.S. Application Data

(63) Continuation of application No. 17/513,664, filed on Oct. 28, 2021, now Pat. No. 11,886,105.

(30) Foreign Application Priority Data

Feb. 4, 2021 (CN) .......................... 202120320562.X

(51) Int. Cl.
*G03B 5/00* (2021.01)
*H02K 41/035* (2006.01)

(52) U.S. Cl.
CPC ........... *G03B 5/00* (2013.01); *H02K 41/0354* (2013.01); *G03B 2205/0069* (2013.01)

(58) Field of Classification Search
CPC .. G03B 5/00; G03B 2205/0069; G03B 30/00; H02K 41/0354; H02K 41/0356; G02B 7/005; G02B 7/09
See application file for complete search history.

(56) References Cited

U.S. PATENT DOCUMENTS

| | | |
|---|---|---|
| 7,824,226 B1 | 11/2010 | Yang |
| 2013/0156415 A1 | 6/2013 | Tanaka et al. |
| 2014/0256379 A1 | 9/2014 | Hsu et al. |
| 2017/0146770 A1 | 5/2017 | Kuo |
| 2018/0180838 A1 | 6/2018 | Wu et al. |
| 2020/0393634 A1 | 12/2020 | Shen et al. |

FOREIGN PATENT DOCUMENTS

CN        207338721 U    5/2018

*Primary Examiner* — Christopher M Koehler
*Assistant Examiner* — Viswanathan Subramanian
(74) *Attorney, Agent, or Firm* — Birch, Stewart, Kolasch & Birch, LLP

(57) ABSTRACT

The present disclosure provides a base assembly of voice coil motor and a voice coil motor. The base assembly includes a base body having a first elastic piece connecting area, a lower elastic piece disposed on the first elastic piece connecting area, and a first terminal disposed in the base body. The first terminal has: a first conductive part disposed in the base body; a first terminal connecting part disposed on one side of the first conductive part and extending toward a direction away from the first conductive part, wherein a part of the first terminal connecting part protrudes from the first elastic piece connecting area and is contacted and connected with the lower elastic piece; and an engaging part disposed on one side of the first terminal connecting part and extending toward a direction away from the first terminal connecting part.

14 Claims, 20 Drawing Sheets

Prior Art

Prior Art

Prior Art

Prior Art

BASE ASSEMBLY OF VOICE COIL MOTOR AND VOICE COIL MOTOR

CROSS REFERENCE TO RELATED DISCLOSURE

This application is a Continuation application of U.S. patent application Ser. No. 17/513,664, filed on Oct. 28, 2021, which claims the priority benefit of Chinese Patent Application Serial Number CN202120320562.X, filed on Feb. 4, 2021. These and all other referenced extrinsic materials are incorporated herein by reference in their entirety.

BACKGROUND

Technical Field

The present disclosure relates to the technical field of voice coil motor, particularly to a base assembly of voice coil motor and a voice coil motor.

Related Art

FIGS. 1 to 3 are respectively a schematic diagram of a terminal, a schematic diagram of a base assembly, and a schematic diagram of the cutting process of the terminal of a voice coil motor in the prior art. As shown in the Figure, the base assembly of the voice coil motor includes a terminal P1 and a base body P2. The terminal P1 is disposed in the base body P2. More specifically, by injection molding or the like, the base body P2 is formed outside the terminal P1 and covers the terminal P1. Next, as shown in FIG. 3, after the base body P2 is formed outside the terminal P1, a connecting part P10 between the terminal P1 and a strip P3 is cut along the vertical direction D by a cutting jig.

In order to prevent the terminal P1 from shifting during the cutting process, the base body P2 is usually disposed with a stepped part P20. Space may be provided by the stepped part P20 for a pressing jig P4 to press the terminal P1. When the cutting jig cuts the connecting part P10, the terminal P1 may be prevented from warping by pressing the pressing jig P4 against the terminal P1 on the stepped part P20.

However, as the size of the product becomes smaller and smaller, the design of the stepped part P20 of the base body P2 may not retain due to the limited space. FIG. 4 is another schematic diagram of the cutting process of the terminal in the prior art. As shown in the Figure, when the terminal P1 is not pressed by the pressing jig P4 during cutting process, the terminal P1 may be pushed by the cutting jig and cause warping.

SUMMARY

The embodiments of the present disclosure disclose a base assembly of voice coil motor and a voice coil motor, in order to solve the problem of warping of the terminal due to no space for using the pressing jig in the cutting process.

In order to solve the above technical problems, the present disclosure is implemented as follows.

In the first aspect, the present disclosure provides a base assembly of voice coil motor, including a base body having a first elastic piece connecting area, a lower elastic piece disposed on the first elastic piece connecting area, and a first terminal disposed in the base body. The first terminal has: a first conductive part disposed in the base body; a first terminal connecting part disposed on one side of the first conductive part and extending toward a direction away from the first conductive part, wherein a part of the first terminal connecting part protrudes from the first elastic piece connecting area and is contacted and connected with the lower elastic piece; and an engaging part disposed on one side of the first terminal connecting part and extending toward a direction away from the first terminal connecting part.

In the second aspect, the present disclosure provides voice coil motor including the base assembly mentioned as the first aspect and a coil assembly disposed on the base assembly. The coil assembly includes a magnet disposed on the first elastic piece connecting area; a conductive pillar electrically connected to the lower elastic piece; a frame disposed on the base body, wherein the frame is recessed to form an annular groove; a coil disposed in the annular groove and electrically connected to the conductive pillar; and an upper elastic piece disposed on the frame.

In the embodiment of the present disclosure, the first terminal is fixed in the base body by the engaging part. As a result, in the case of without pressing by using the pressing jig, the first terminal may still be cut stably and prevented from warping. That is, the base assembly of the present disclosure is small. Also, an excellent yield of the base assembly without stepped part may be achieved.

BRIEF DESCRIPTION OF THE DRAWINGS

The Figures described herein are used to provide a further understanding of the present disclosure and constitute a part of the present disclosure. The exemplary embodiments and descriptions of the present disclosure are used to illustrate the present disclosure and do not limit the present disclosure, in which.

DETAILED DESCRIPTION OF THE EMBODIMENTS

Figure 1:
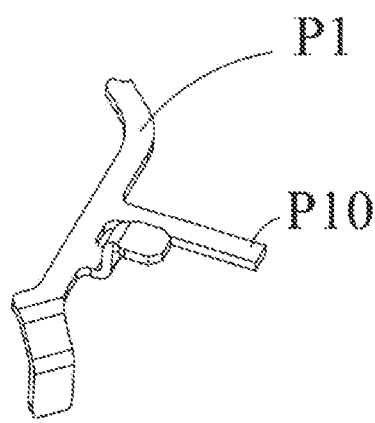
FIG. 1 is a schematic diagram of the terminal of the voice coil motor in the prior art.
Figure 2:
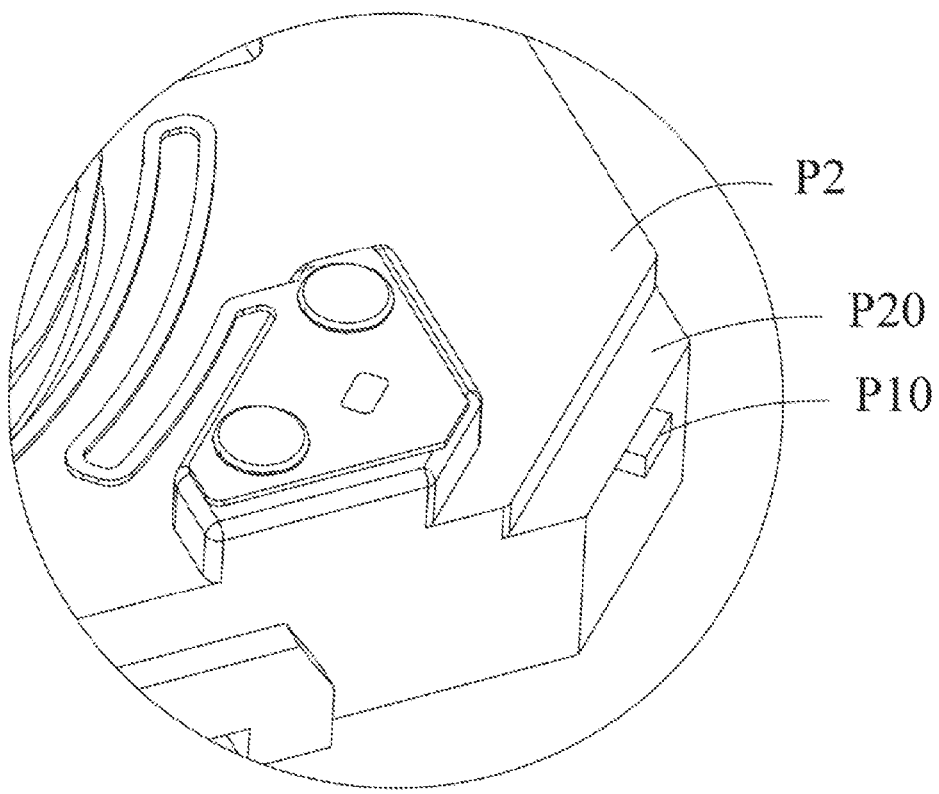
FIG. 2 is a schematic diagram of the base assembly of the voice coil motor in the prior art.

In order to make the objectives, technical solutions, and advantages of the present disclosure clearer, the technical solutions of the present disclosure will be described clearly and completely in conjunction with specific embodiments and the Figures of the present disclosure. Obviously, the described embodiments are only a part of the embodiments of the present disclosure, rather than all the embodiments. Based on the embodiments in the present disclosure, all other embodiments obtained by a person of ordinary skill in the art without creative work fall within the protection scope of this disclosure.

The following description is of the best-contemplated mode of carrying out the present disclosure. This description is made for the purpose of illustrating the general principles of the present disclosure and should not be taken in a limiting sense. The scope of the present disclosure is best determined by reference to the appended claims.

Moreover, the terms "include", "contain", and any variation thereof are intended to cover a non-exclusive inclusion. Therefore, a process, method, object, or device that comprises a series of elements not only includes these elements, but also comprises other elements not specified expressly, or may include inherent elements of the process, method, object, or device. If no more limitations are made, an element limited by "include a/an . . . " does not exclude other same elements existing in the process, the method, the article, or the device which comprises the element.

FIGS. 5 to 11 respectively are a schematic diagram and an exploded diagram of the base assembly, a schematic diagram of the base body, a schematic diagram of the lower elastic piece, a schematic diagram of the first terminal, a front view of the first terminal, and a schematic diagram of assembling the first terminal and the base body of an embodiment of the present disclosure. The base assembly 1 includes a base body 10 having a first elastic piece connecting area 100, a lower elastic piece 11 disposed on the first elastic piece connecting area 100, and a first terminal 12 disposed in the base body 10. The first terminal 12 has a first conductive part 120 disposed in the base body 10, wherein the first conductive part 120 is extended along a first direction D1; a first terminal connecting part 121 disposed on one side of the first conductive part 120 and extending toward a direction away from the first conductive part 120, wherein a part of the first terminal connecting part 121 protrudes from the first elastic piece connecting area 100 and is connected with the lower elastic piece 11; and an engaging part 122 disposed on one side of the first terminal connecting part 121 and extending toward a direction away from the first terminal connecting part 121.

In the present embodiment, the first terminal 12 is stably engaged in the first elastic piece connecting area 100 through the engaging part 122. In this way, the problem of warping of the terminal caused by the cutting process may be solved. Therefore, the design diversification and volume reduction of the base assembly 1 may be achieved. Hereinafter, the elements mentioned above will be explained in detail to make the technical features of the present disclosure clearer.

Figure 7:
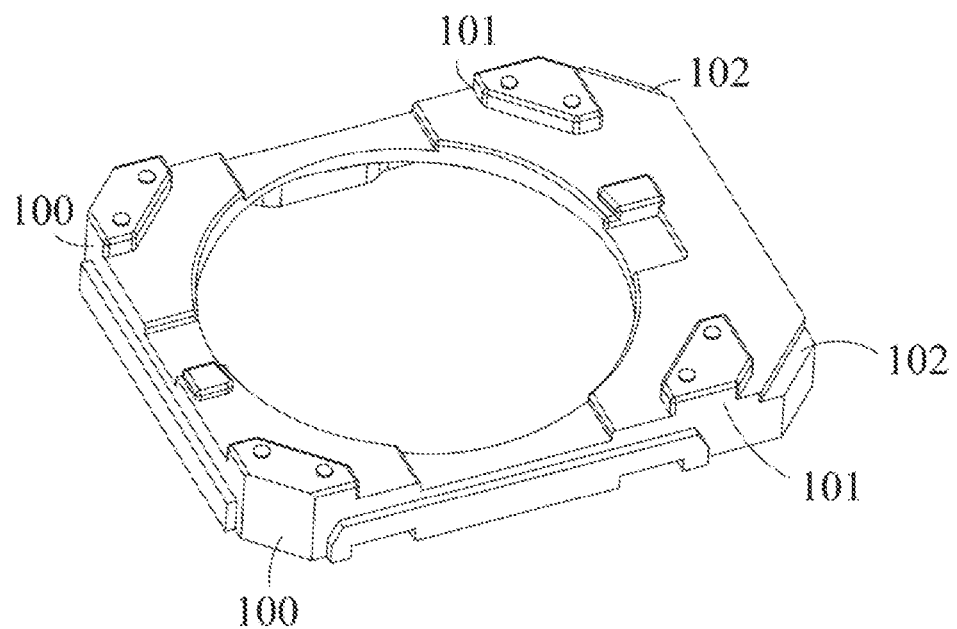
FIG. 7 is a schematic diagram of the base body according to an embodiment of the present disclosure.

As shown in FIG. 7, in some embodiments, the base body 10 may further have a second elastic piece connecting area 101 and a stepped part 102, and the second elastic piece connecting area 101 is disposed on one side of the stepped part 102. More specifically, the base body 10 has two first elastic piece connecting areas 100, two second elastic piece connecting areas 101, and two stepped parts 102. The first elastic piece connecting area 100 is disposed on the side of the base body 10 where the stepped part 102 is not disposed, and the second elastic piece connecting area 101 is disposed on the side of the base body 10 where the stepped portion 102 is disposed. In other words, the terminal (ie, the first terminal 12) disposed in the first elastic piece connecting area 100 needs to have an engaging part (ie, the engaging part 122) to avoid warping during the cutting process. On the other hand, the terminal (the second terminal 14 mentioned hereinafter) disposed in the second elastic piece connecting area 101 may not have an engaging part. The warping during the cutting process of the terminal without engaging part is avoided through the cooperation of the stepped part 102 with the pressing jig. In some embodiments, the two first elastic piece connecting areas 100 and the two second elastic piece connecting areas 101 are respectively disposed at four corners of the base body 10.

Figure 8:
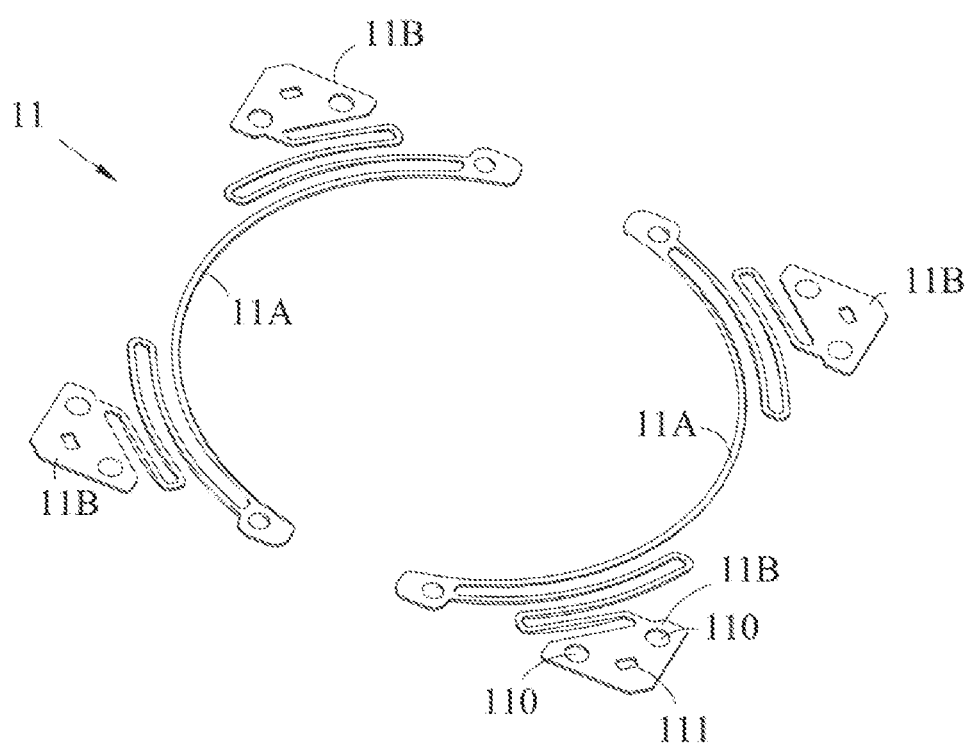
FIG. 8 is a schematic diagram of the lower elastic piece according to an embodiment of the present disclosure.

As shown in FIG. 8, the number of lower elastic pieces 11 is two, and each lower elastic piece 11 includes an elastic piece connecting part 11A and two lower elastic piece parts 11B located at both ends of the elastic piece connecting part 11A. The lower elastic piece parts 11B has a first connecting hole 110 and a second connecting hole 111. The first connecting hole 110 is used to connect the lower elastic piece 11 with the first terminal connecting part 121 of the first terminal 12 or a second terminal connecting part 141 of the second terminal 14. The second connecting hole 111 is used to connect the lower elastic piece 11 with the first elastic piece connecting area 100 or the second elastic piece connecting area 101.

Figure 6:
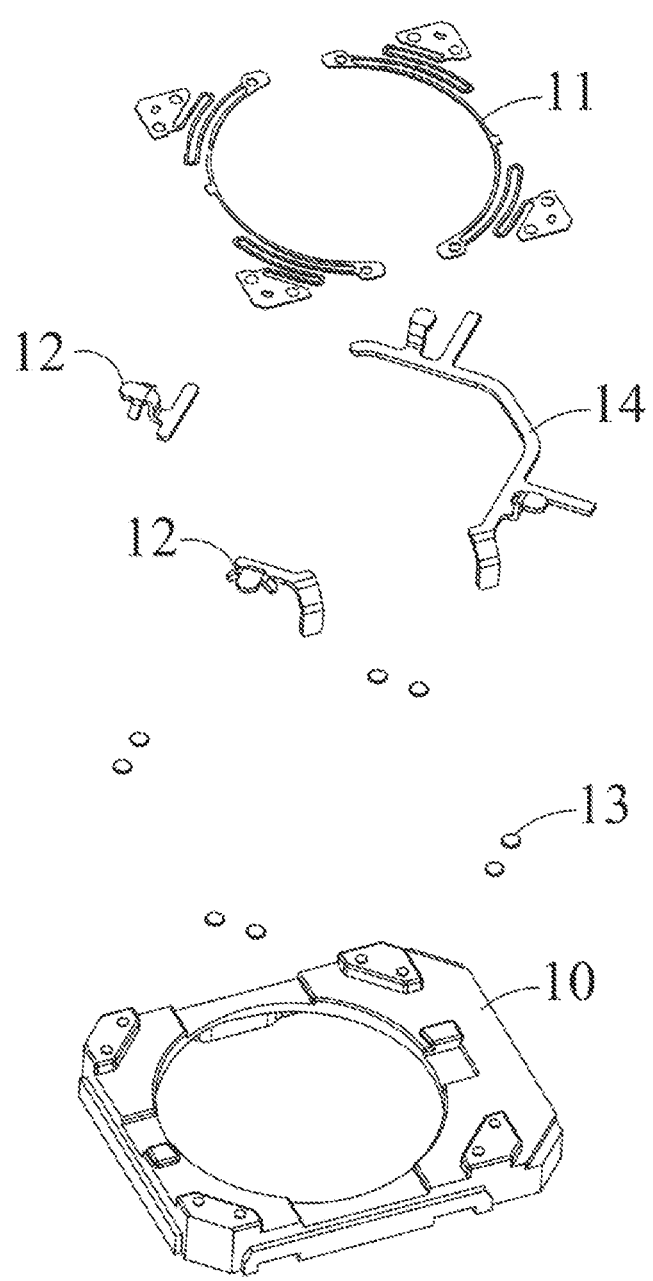
FIG. 6 is an exploded diagram of the base assembly according to an embodiment of the present disclosure.

The lower elastic piece 11 and the first terminal 12 are taken as an example. In some embodiments, the lower elastic piece 11 may be riveted to the first elastic piece connecting area 100 through the first connecting hole 110. For example, the base assembly 1 may further include a connecting member 13 (as shown in FIG. 6), and the connecting member 13 may be a rivet or an element with similar or identical functions. In this way, the connecting member 13 may be inserted into the first connecting hole 110 and fixes the lower elastic piece 11 to the first elastic piece connecting area 100 through a hot riveting process.

Figure 5:
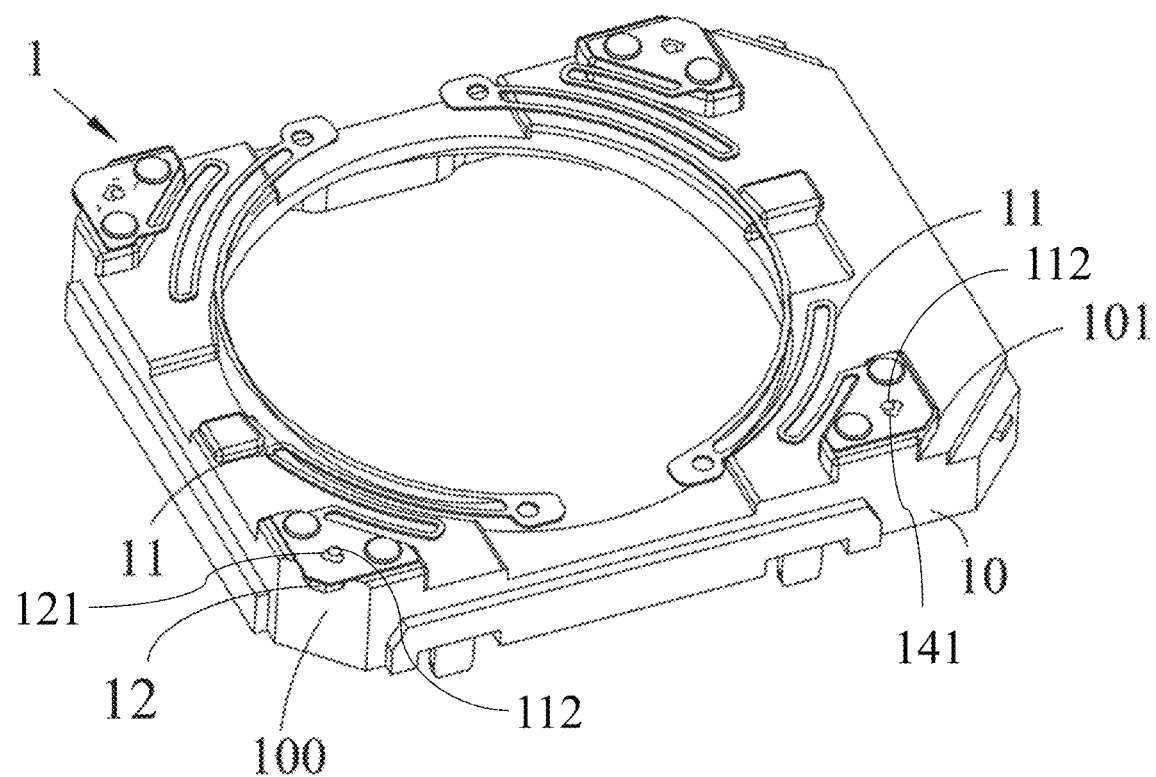
FIG. 5 is a schematic diagram of the base assembly according to an embodiment of the present disclosure.

The lower elastic piece 11 and the first terminal 12 are taken as an example. In some embodiments, the lower elastic piece 11 may be welded to the first terminal connecting part 121 through the second connecting hole 111. For example, the lower elastic piece 11 and the first terminal connecting part 121 may be fixedly connected by an adhesive containing metal. For example, the lower elastic piece 11 and the first terminal connecting part 121 may be fixedly connected through the second connecting hole 111 by a solder or weld joint 112 (as shown in FIG. 5 and FIG. 8). Alternatively, the lower elastic piece 11 and the first terminal connecting part 121 may also be directly heated so that the materials thereof melt and diffuse into each other. Therefore, the lower elastic piece 11 and the first terminal connecting part 121 may be fixedly connected to each other. Since electrical connection between the lower elastic piece 11 and the first terminal connecting part 121 is needed, the size of the second connecting hole 111 may be adjusted according to welding requirements. Specifically, the larger the size of the second connecting hole 111, the larger space for welding (better fixing effect), but the overlapping area of the lower elastic piece 11 and the first terminal connecting part 121 decreases (the resistivity increases). Conversely, the smaller the size of the second connecting hole 111, the smaller space for welding (more difficult to fix), but the overlapping area of the lower elastic piece 11 and the first terminal connecting part 121 increases (the resistivity decreases).

On the other hand, the connection method of the lower elastic piece 11 and the second terminal 14 is similar or the same as the connection method between the lower elastic piece 11 and the first terminal 12, so the detailed description is omitted.

Figure 9:
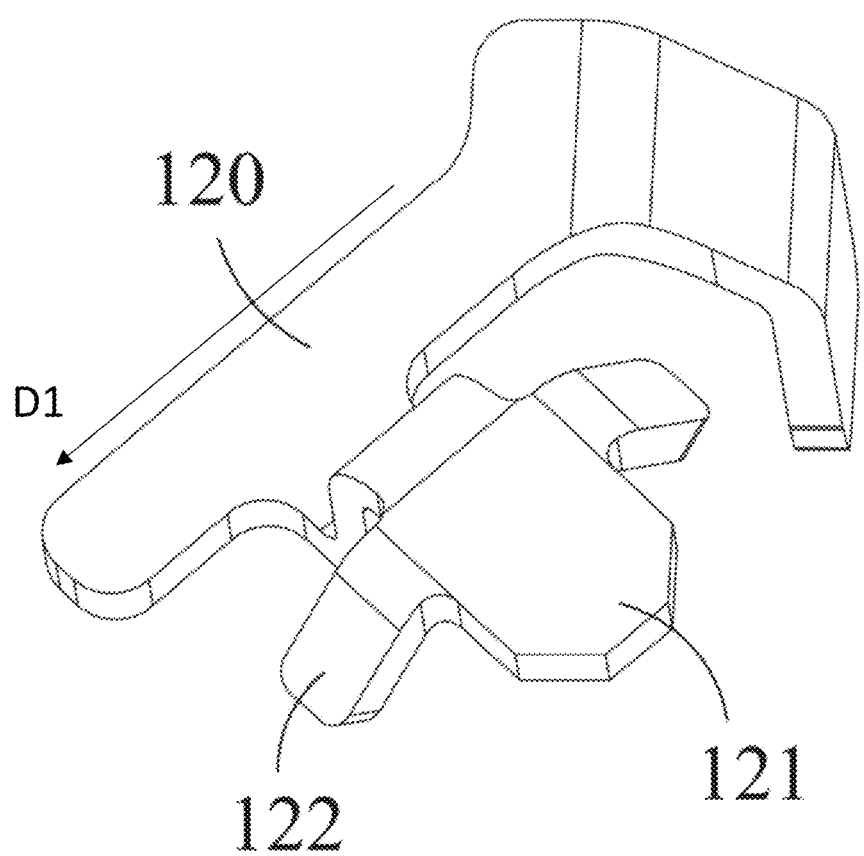
FIG. 9 is a schematic diagram of the first terminal according to an embodiment of the present disclosure.
Figure 10:
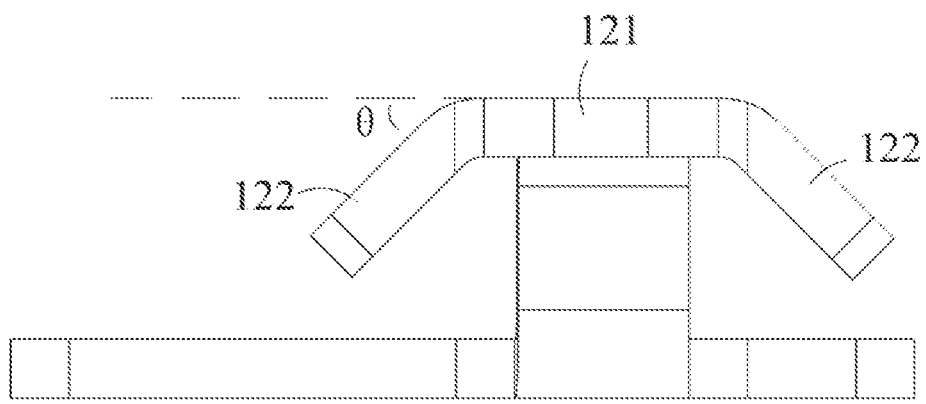
FIG. 10 is a front view of the first terminal according to an embodiment of the present disclosure.

As shown in FIG. 9, the first terminal 12 has the first conductive part 120, the first terminal connecting part 121, and the engaging part 122. The first conductive part 120 is used to conduct electricity. The first terminal connecting part 121 protrudes from the upper surface of the first elastic piece connecting area 100 and is used to connect the lower elastic piece 11. The engaging part 122 is in the first elastic piece connecting area 100. In the present embodiment, the number of the engaging parts 122 is two, and the two engaging parts are respectively disposed on opposite sides of the first terminal connecting part 121. As shown in FIG. 10, in some embodiments, the angle θ between the engaging part 122 and the plane where the first terminal connecting part 121 is located is less than 90°. For example, the engaging part 122 and the first terminal connecting part 121 are located on the same plane in the initial state, and the engaging part 122 is bent 60° with respect to the first terminal connecting part 121 by bending. Therefore, the angle θ between the engaging part 122 and the plane where the first terminal connecting part 121 is located is 60°. In some embodiments, the angle θ may be 15°, 30°, 45°, 60°, 75°, or a range of any combination of the foregoing values.

Figure 3:
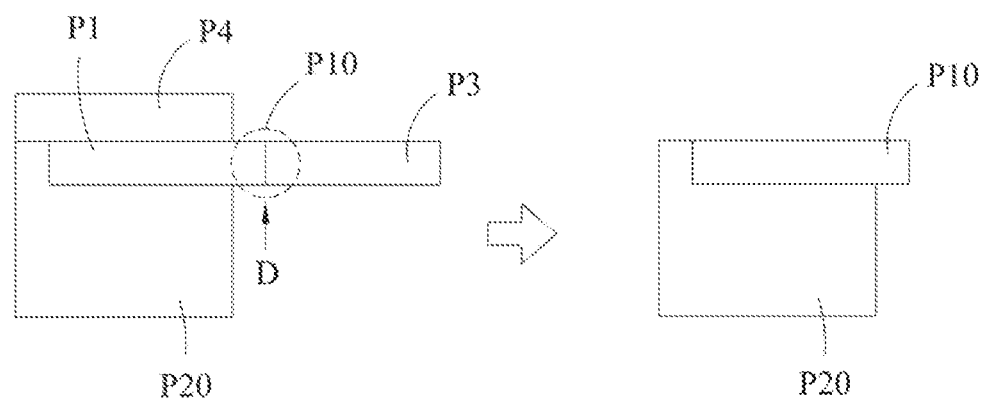
FIG. 3 is a schematic diagram of the cutting process of the terminal of the voice coil motor in the prior art.
Figure 4:
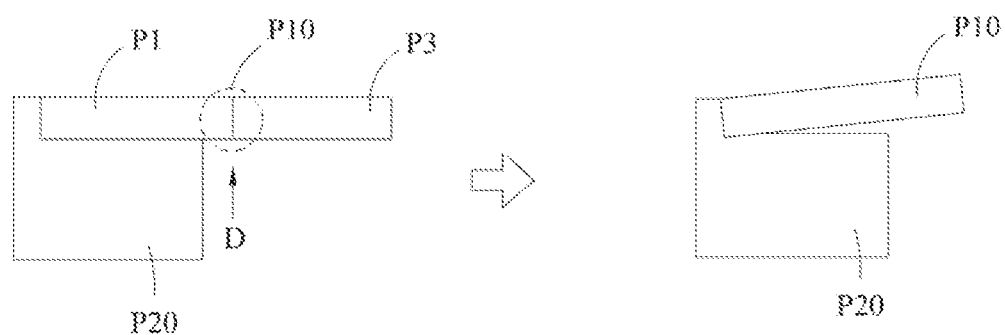
FIG. 4 is another schematic diagram of the cutting process of the terminal of the voice coil motor in the prior art.
Figure 11:
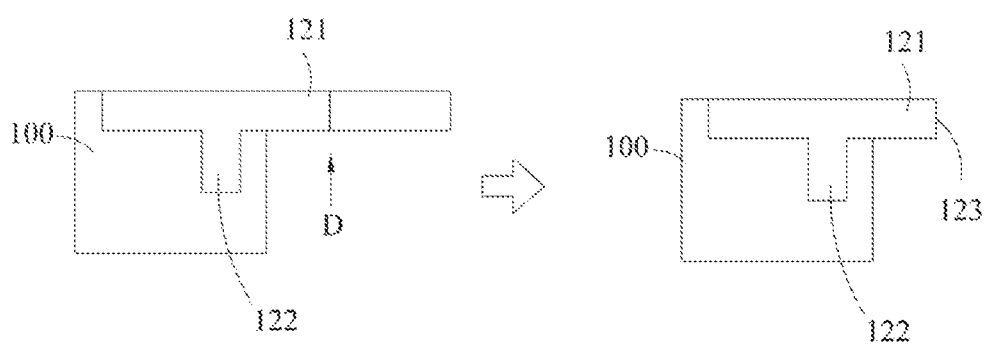
FIG. 11 is a schematic diagram of assembling the first terminal and the base body according to an embodiment of the present disclosure.

As shown in FIG. 11, in some embodiments, the first terminal 12 further has a first cutting part 123, and the first cutting part 123 is disposed on the side of the first terminal connecting part 121 away from the first conductive part 120 and extends toward a direction away from the first terminal connecting part 121. A part of the first cutting part 123 protrudes from the first elastic piece connecting area 100. For example, the initial state of the first cutting part 123 before being cut is a strip extending continually toward a direction away from the first terminal connecting part (referring to strip P3 in FIG. 3). When the base body 10 and the first terminal 12 are formed, the strip may be fixed by a fixing jig to maintain the relative position of the first terminal 12 and the base body 10 during the forming process. After the forming process, the strip is cut by a cutting jig, so as to a first cutting part 123 slightly protruding from the first elastic piece connecting area 100 is left.

Figure 12:
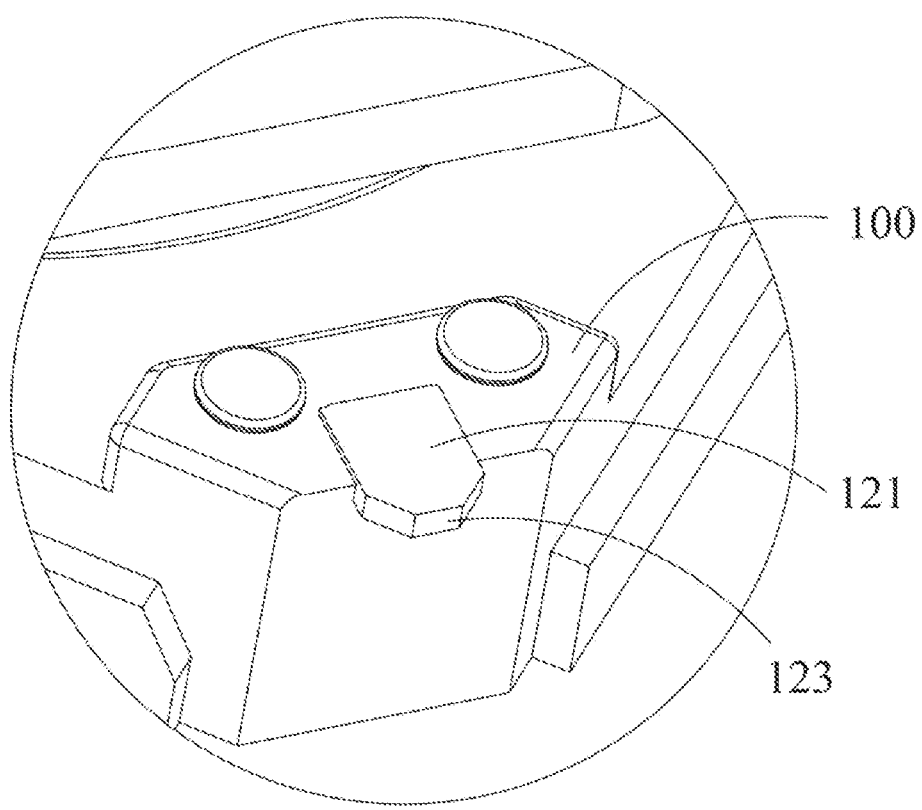
FIG. 12 is a schematic diagram of the cutting process of the first terminal according to an embodiment of the present disclosure.

FIG. 12 is a schematic diagram of the cutting process of the first terminal of an embodiment of the present disclosure. As shown in the figure, the first terminal 12 may have sufficient supporting force to be pressed by the cutting jig during the cutting process by disposing the first terminal 12 having the engaging part 122 in the present disclosure. Thus, reduction in product quality due to warping of the first terminal 12 may be avoided. It should be noted that the engaging part 122 is used to improve the supporting force of the first terminal 12 in the first elastic piece connecting area 100. Therefore, the engaging part 122 of the present disclosure is not limited to that shown in FIG. 9. In practical applications, the engaging part 122 may have different sizes, shapes, or bending angles. That is, as long as the supporting force of the first terminal 12 may be improved, different aspects of the engaging parts are all within the scope of the present disclosure.

Figure 13:
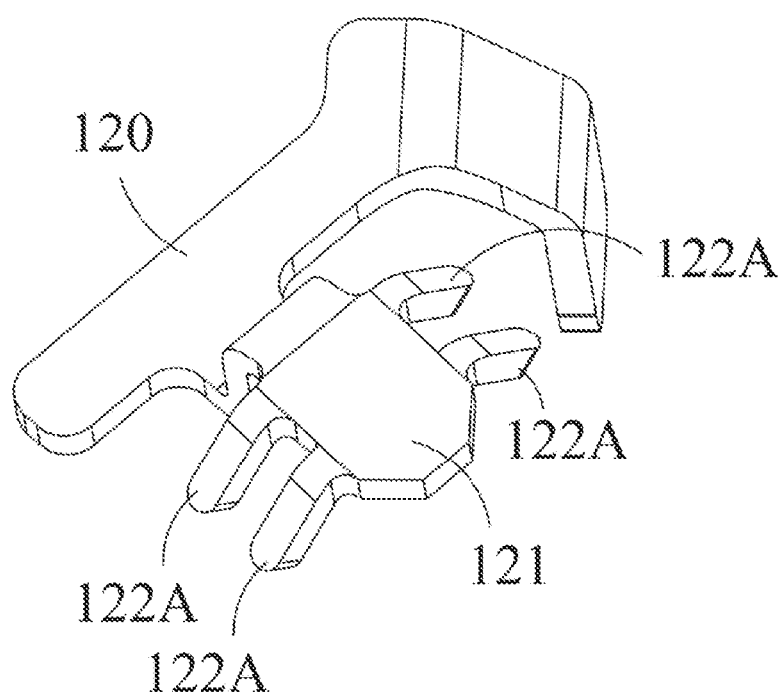
FIG. 13 is a schematic diagram of the first terminal according to another embodiment of the present disclosure.

FIG. 13 is a schematic diagram of the first terminal according to another embodiment of the present disclosure. As shown in the figure, in some embodiments, the number of the engaging parts 122 is two, and the two engaging parts 122 are respectively disposed on opposite sides of the first terminal connecting part 121. In addition, the two engaging parts 122 may respectively include a plurality of sub-engaging parts 122A disposed at intervals. In this embodiment, the number of the sub-engaging parts 122A on one side of the first terminal connecting part 121 is two, but the present disclosure is not limited thereto. For example, the number of the sub-engaging parts 122A on one side of the first terminal connecting part 121 may be three, four, five, or more than five. In addition, each sub-engaging part 122A may also have a different shape, size, or bending angle. The engagement of the first terminal 12 may be more stable by the plurality of sub-engaging parts 122A.

Figure 14:
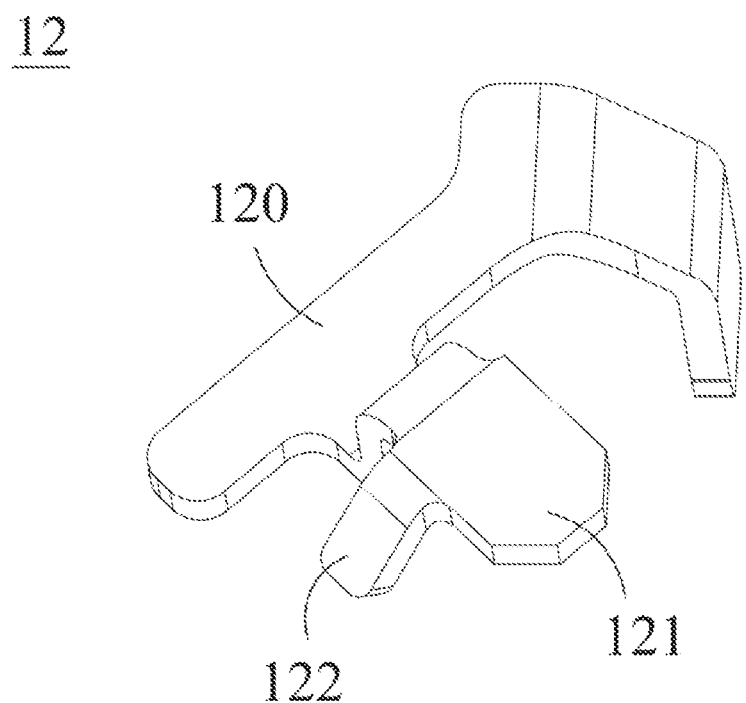
FIG. 14 is a schematic diagram of the first terminal according to a yet embodiment of the present disclosure.

FIG. 14 is a schematic diagram of a first terminal according to a yet embodiment of the present disclosure. As shown in the figure, in some embodiments, the number of the engaging part 122 may be one to correspond to the base bodies 10 with different shapes or sizes.

Figure 15:
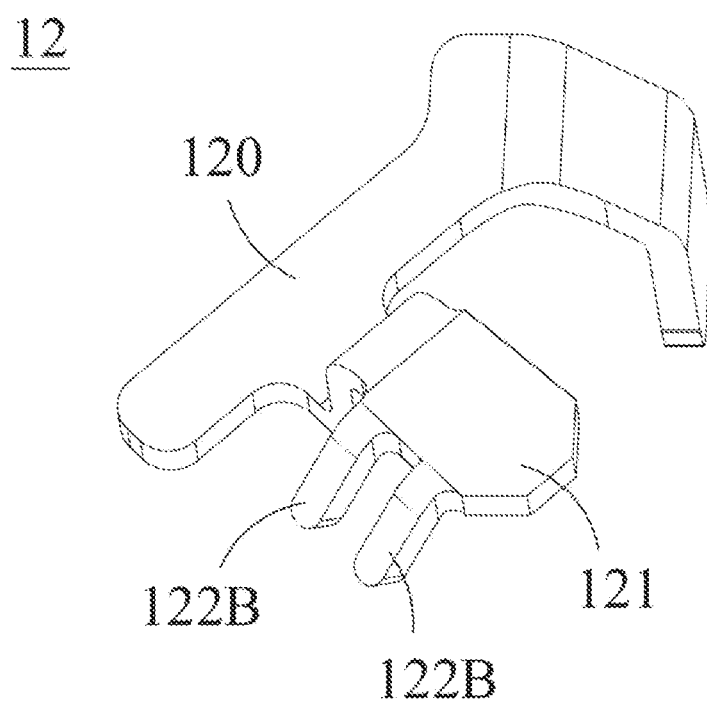
FIG. 15 is a schematic diagram of the first terminal according to a yet embodiment of the present disclosure.

FIG. 15 is a schematic diagram of the first terminal according to a yet embodiment of the present disclosure. As shown in the figure, in some embodiments, the number of the engaging part 122 may be one to correspond to the base bodies 10 with different shapes or sizes. In addition, the engaging part 122 may include a plurality of sub-engaging parts 122B, and the plurality of sub-engaging parts 122B are disposed on one side of the first terminal connecting part 121 at intervals. In the present embodiment, the number of the sub-engaging part 122B on one side of the first terminal connecting part 121 is two, but the present disclosure is not limited thereto. For example, the number of the sub-engaging part 122B on one side of the first terminal connecting part 121 may be three, four, five, or more than five. In addition, each sub-engaging part 122B may also have a different shape, size or bending angle. The engagement of the first terminal 12 may be more stable by the plurality of sub-engaging parts 122B.

Figure 16:
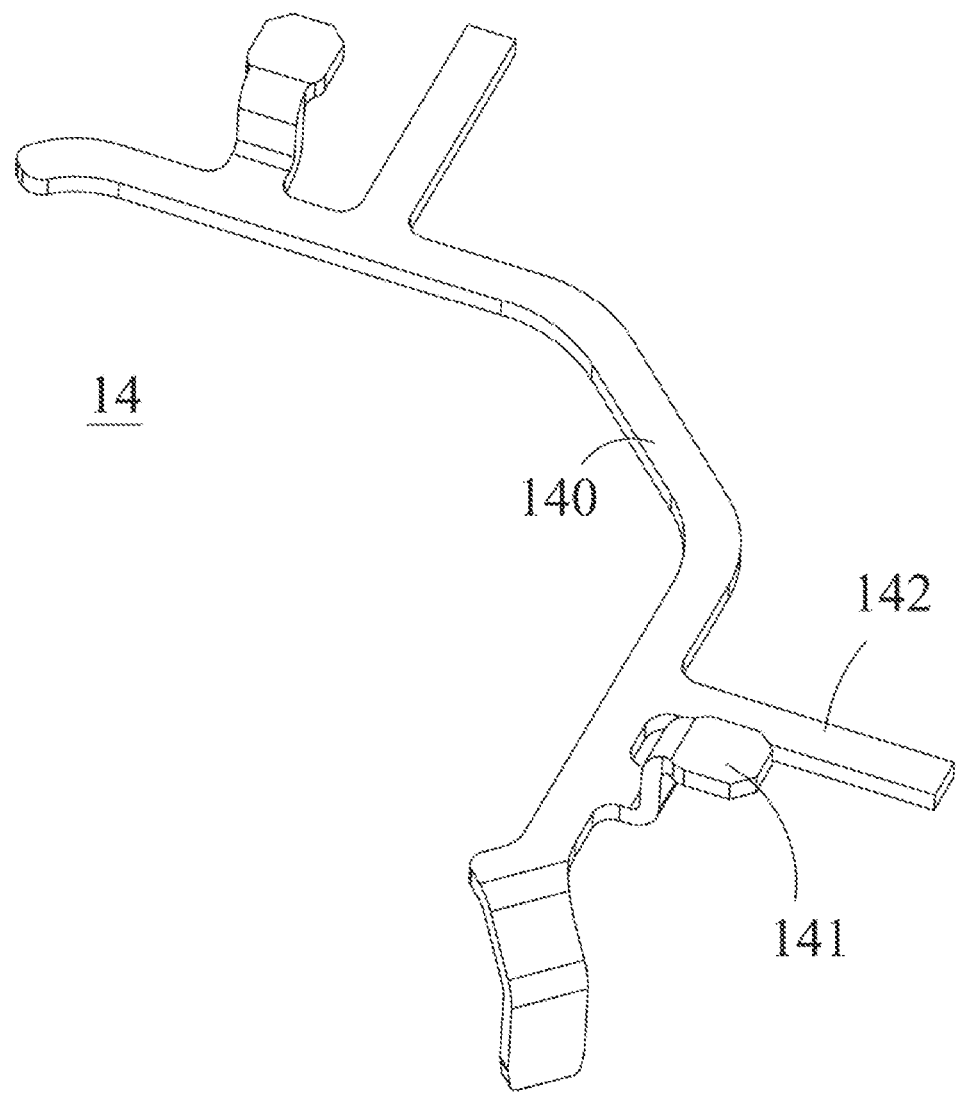
FIG. 16 is a schematic diagram of the second terminal of an embodiment of the present disclosure.
Figure 17:
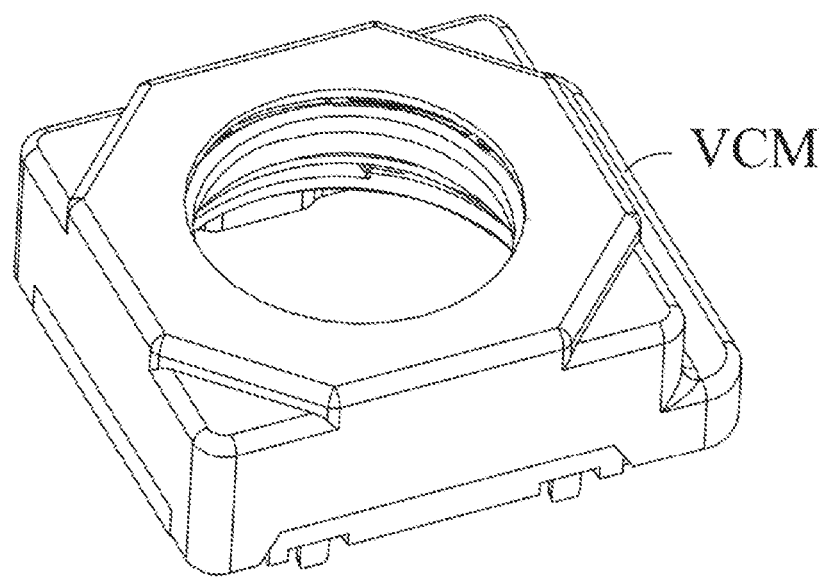
FIG. 17 is a schematic diagram of the voice coil motor according to an embodiment of the present disclosure.
Figure 18:
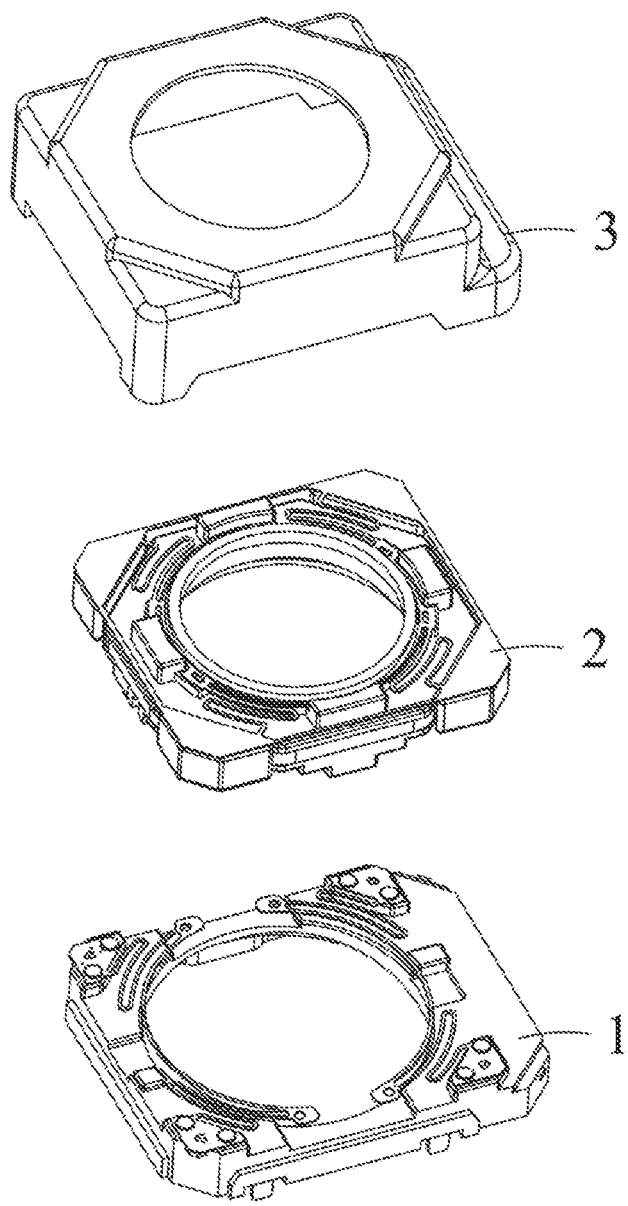
FIG. 18 is an exploded diagram of the voice coil motor according to an embodiment of the present disclosure.
Figure 19:
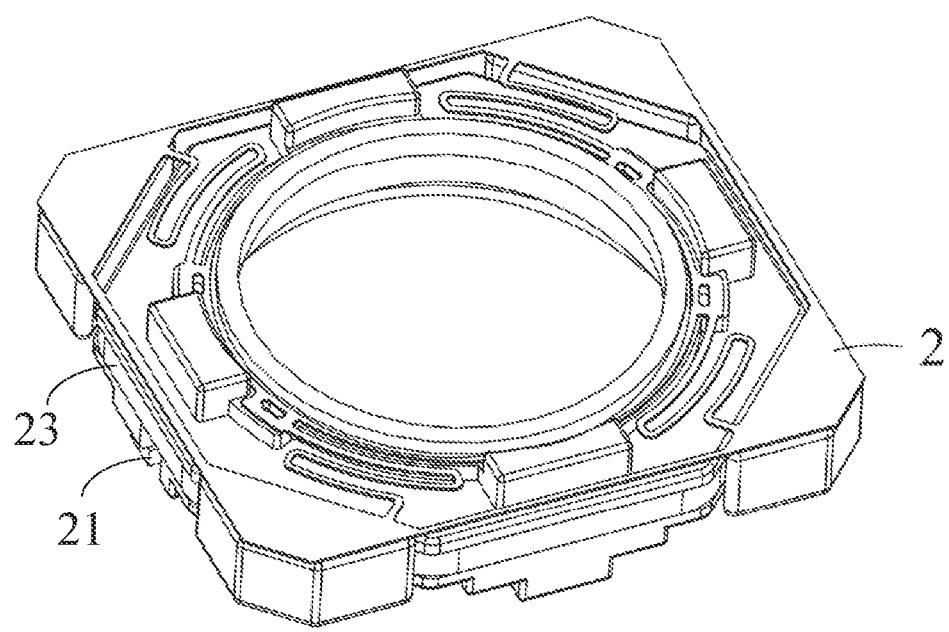
FIG. 19 is a schematic diagram of the coil assembly according to an embodiment of the present disclosure.
Figure 20:
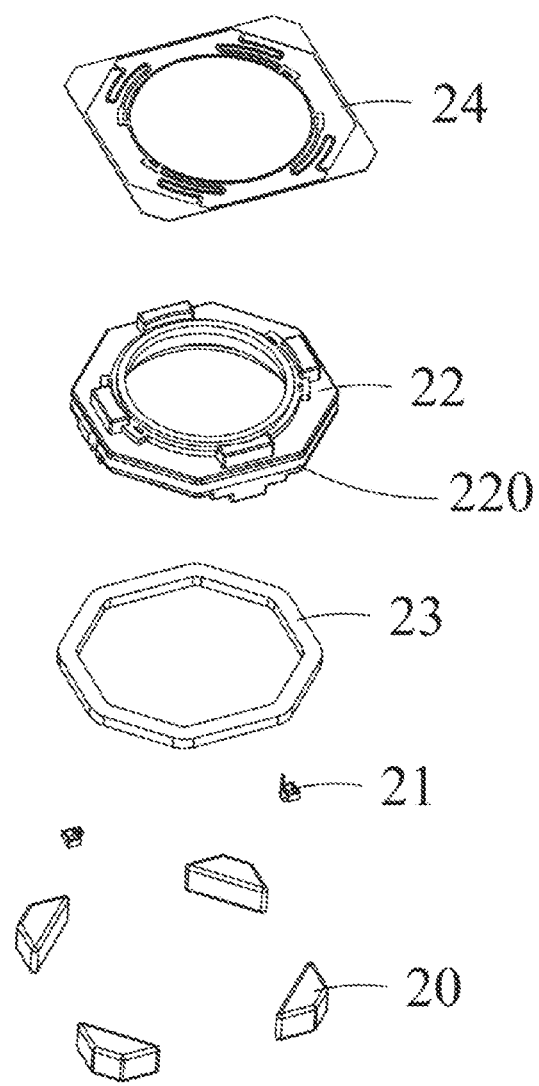
FIG. 20 is an exploded diagram of the coil assembly according to an embodiment of the present disclosure.

FIG. 16 is a schematic diagram of the second terminal according to an embodiment of the present disclosure. As shown in the figure, in some embodiments, the base assembly 1 may further include the second terminal 14. The second terminal 14 is disposed in the base body 10. More specifically, the second terminal 14 is disposed on the side of the base body 10 close to the stepped part 102. The second terminal 14 has a second conductive part 140, the second terminal connecting part 141, and a second cutting part 142. The second conductive part 140 is disposed in the base body 10. The second terminal connecting part 141 is disposed on one side of the second conductive part 140 and extends toward a direction away from the second conductive part 140. A part of the second terminal connecting part 141 protrudes from the second elastic piece connecting area 101 and is connected to the lower elastic piece 11. For example, the lower elastic piece 11 and the second terminal connecting part 141 may be fixedly connected through the second connecting hole 111 by the solder or weld joint 112 (as shown in FIG. 5 and FIG. 8). The second cutting part 142 is disposed on one side of the second conductive part 140 and extends toward a direction away from the second conductive part 140. A part of the second cutting part 142 protrudes from the stepped part 102 of the base body 10.

FIGS. 17 to 20 respectively are a schematic diagram and an exploded diagram of a voice coil motor, and a schematic diagram and an exploded diagram of a coil assembly according to an embodiment of the present disclosure. As shown in the figure, the voice coil motor VCM includes a base assembly 1 and a coil assembly 2. In the present embodiment, the base assembly 1 may be similar or the same as the base assembly 1 in the embodiment mentioned above, so the detailed description is omitted.

The coil assembly 2 is disposed on the base assembly 1 and includes a magnet 20, a conductive pillar 21, a frame 22, a coil 23, and an upper elastic piece 24. The number of magnets 20 is four, and the four magnets are respectively disposed on the two first elastic piece connecting areas 100 and the two second elastic piece connecting areas 101. The conductive pillar 21 is electrically connected to the lower elastic piece 11. The frame 22 is disposed on the base body 10, and the frame 22 is recessed to form an annular groove 220. The coil 23 is disposed in the annular groove 220 and is electrically connected to the lower elastic piece 11 through the conductive pillar 21. The upper elastic piece 24 is disposed on the frame 22.

In some embodiments, the voice coil motor VCM further includes a case 3 covering the base assembly 1 and the coil assembly 2. The case 3 is used to prevent the base assembly 1 and the coil assembly 2 from water or dust. Therefore, the reduction of the life of the components may be avoided.

Refer to FIG. 9. In some embodiments, the coil 23, the conductive pillar 21, the lower elastic piece 11, and the first terminal 12 form a current path. More specifically, when the voice coil motor VCM includes the first terminal 12 and the second terminal 14, the first terminal 12 and the second terminal 14 may have input/output terminals, respectively. That is, the first terminal 12 and the second terminal 14 are respectively responsible for the input and output of current. Wherein, the input/output terminal, the coil 23, the conductive pillar 21, the lower elastic piece 11, and a power supply form a loop, and the loop is used with the magnet 20 to move a lens (not shown) at the center of the voice coil motor VCM. In other words, the current enters the coil 23 from the first terminal 12 or the second terminal 14 along the lower elastic piece 11 and the conductive pillar 21 to form an electric field. A magnetic field generated by the electric field mentioned above may interact with the magnet 20 and move the lens at the center of the voice coil motor VCM.

In summary, the first terminal is fixed in the base body by the engaging part. As a result, in the case of without pressing by using the pressing jig, the first terminal may still be cut stably and prevented from warping. That is, the base assembly of the present disclosure is small. Also, an excellent yield of the base assembly without stepped part may be achieved.

A person of ordinary skill in the art will understand current and future manufacturing processes, method and step from the content disclosed in some embodiments of the present disclosure, as long as the current or future manufacturing processes, method, and step performs substantially the same functions or obtain substantially the same results as the present disclosure. Therefore, the scope of the present disclosure includes the above-mentioned manufacturing process, method, and steps.

The above descriptions are only examples of this application and are not intended to limit this application. This disclosure may have various modifications and changes for a person of ordinary skill in the art. Any modification, equivalent replacement, improvement, etc. made within the spirit and principle of this application shall be included in the scope of the claims of this disclosure.

What is claimed is:

1. A base assembly of voice coil motor, comprising:
a base body having a first elastic piece connecting area;
a lower elastic piece disposed on the first elastic piece connecting area; and
a first terminal disposed in the base body, wherein the first terminal comprises:
a first conductive part disposed in the base body and extended along a first direction;
a first terminal connecting part disposed on one side of the first conductive part and extending toward a direction away from the first conductive part, contacted and connected with the lower elastic piece, and comprising a first cutting part, wherein the first cutting part is disposed on and connected to one side of the first terminal connecting part away from the first conductive part and extending toward the direction away from the first terminal connecting part, a part of the first cutting part protrudes from the first elastic piece connecting area; and
an engaging part disposed on one side of the first terminal connecting part and protruding from the first terminal connecting part along the first direction,
wherein an angle between the engaging part and a plane where the first terminal connecting part is located is less than 90°,
wherein the engaging part is provided in two, and the two engaging parts are respectively disposed on opposite sides of the first terminal connecting part.

2. The base assembly of voice coil motor according to claim 1, wherein each of the two engaging parts comprises a plurality of sub-engaging parts, and the plurality of sub-engaging parts of the two engaging parts are respectively disposed at intervals on opposite sides of the first terminal connecting part.

3. The base assembly of voice coil motor according to claim 1, wherein the two engaging parts respectively comprise a plurality of sub-engaging parts disposed at intervals.

4. The base assembly of voice coil motor according to claim 3, wherein each of the plurality of sub-engaging parts has a different shape, size, or bending angle.

5. The base assembly of voice coil motor according to claim 1, wherein the base body further has a second elastic piece connecting area and a stepped part, and the second elastic piece connecting area is disposed on one side of the stepped part.

6. The base assembly of voice coil motor according to claim 5, further comprising a second terminal disposed in the base body, wherein the second terminal has:
a second conductive part disposed in the base body;
a second terminal connecting part disposed on one side of the second conductive part and extending toward a direction away from the second conductive part, wherein a part of the second terminal connecting part protrudes from the second elastic piece connecting area and is connected with the lower elastic piece; and
a second cutting part disposed on one side of the second conductive part and extending toward a direction away from the second conductive part, and a part of the second cutting part protrudes from the stepped part of the base body.

7. The base assembly of voice coil motor according to claim 6, wherein the lower elastic piece comprises a connecting hole, and the lower elastic piece and the second terminal connecting part are fixedly connected through the connecting hole by a solder or weld joint.

8. The base assembly of voice coil motor according to claim 5, wherein the first elastic piece connecting area is disposed on one side of the base body where the stepped part is not disposed.

9. The base assembly of voice coil motor according to claim 5, wherein the base body comprises two first elastic piece connecting areas, two second elastic piece connecting areas, and two stepped parts.

10. The base assembly of voice coil motor according to claim 9, wherein the base assembly comprises two first terminals and one second terminal.

11. The base assembly of voice coil motor according to claim 1, wherein the lower elastic piece comprises a connecting hole, and the lower elastic piece and the first terminal connecting part are fixedly connected through the connecting hole by a solder or weld joint.

12. The base assembly of voice coil motor according to claim 1, wherein the lower elastic piece comprises an elastic piece connecting part and two lower elastic piece parts located at both ends of the elastic piece connecting part.

13. The base assembly of voice coil motor according to claim 1, wherein the engaging part is engaged with the first elastic piece connecting area.

14. The base assembly of voice coil motor according to claim 1, wherein one end of the engaging part extends toward to the first elastic piece connecting area.

* * * * *